US011285559B2

(12) United States Patent
Klegin et al.

(10) Patent No.: US 11,285,559 B2
(45) Date of Patent: Mar. 29, 2022

(54) WELDING SYSTEM AND METHOD FOR SHIELDED WELDING WIRES

(71) Applicant: Illinois Tool Works Inc., Glenview, IL (US)

(72) Inventors: Michael Todd Klegin, Greenville, WI (US); Caleb Haven, Fairborn, OH (US)

(73) Assignee: Illinois Tool Works Inc., Glenview, IL (US)

( * ) Notice: Subject to any disclaimer, the term of this patent is extended or adjusted under 35 U.S.C. 154(b) by 612 days.

(21) Appl. No.: 14/954,124

(22) Filed: Nov. 30, 2015

(65) Prior Publication Data

US 2017/0151621 A1    Jun. 1, 2017

(51) Int. Cl.
*B23K 9/10*    (2006.01)
*B23K 35/02*   (2006.01)
*B23K 9/173*   (2006.01)
*B23K 9/09*    (2006.01)

(52) U.S. Cl.
CPC ........... *B23K 9/1043* (2013.01); *B23K 9/092* (2013.01); *B23K 9/1006* (2013.01); *B23K 9/173* (2013.01); *B23K 35/0266* (2013.01)

(58) Field of Classification Search
CPC ... B23K 9/1043; B23K 9/1006; B23K 1/1012
USPC ............. 219/139.5, 121.17, 121.23, 121.64, 219/121.13, 121.14, 121.6, 121.63, 219/121.11, 121.12, 121.15, 121.16, 219/121.29, 121.61, 121.68, 121.71, 219/121.84, 121.86; 700/204, 212
See application file for complete search history.

(56) References Cited

U.S. PATENT DOCUMENTS

| | | | |
|---|---|---|---|
| 2,365,958 | A | 12/1944 | Holslag |
| 2,416,047 | A | 2/1947 | Dolan |
| 3,162,751 | A | 12/1964 | Robbins |
| 3,195,230 | A | 7/1965 | Peck |
| 3,288,982 | A | 11/1966 | Haruyoshi |
| 3,362,811 | A | 1/1968 | Heuschkel |

(Continued)

FOREIGN PATENT DOCUMENTS

| | | |
|---|---|---|
| CA | 2072711 | 12/1992 |
| CN | 2181354 | 11/1994 |

(Continued)

OTHER PUBLICATIONS

"ALT 304," Miller—The Power of Blue, Jun. 2001.

(Continued)

*Primary Examiner* — Phuong T Nguyen
(74) *Attorney, Agent, or Firm* — McAndrews, Held & Malloy, Ltd.

(57) ABSTRACT

A welding system and method provide for generating a controlled waveform for welding power output, the waveform comprising a plurality of successive peak phases designed to avoid or reduce micro-arcing when used with metal-cored or flux-cored electrode wires. Ratios of the background current and voltage levels are elevated as compared to conventional techniques, with the levels in most cases exceeding 50% of the peak currents and voltages. Transitions between background and peak levels of current and voltage are also smoothed, and the duration of the peak phase as compared to the duration of each pulse cycle is elongated to further reduce micro-arcing.

18 Claims, 4 Drawing Sheets

(56) References Cited

U.S. PATENT DOCUMENTS

| | | | |
|---|---|---|---|
| 3,405,248 | A | 10/1968 | Essers |
| 3,513,289 | A | 5/1970 | Blake |
| 3,529,996 | A | 9/1970 | David |
| 3,702,390 | A | 11/1972 | Blake |
| 3,725,054 | A | 4/1973 | Perfect |
| 3,725,629 | A | 4/1973 | Vickers |
| 3,745,294 | A | 7/1973 | Arikawa |
| 3,767,891 | A | 10/1973 | Haverstraw |
| 3,809,853 | A | 5/1974 | Manz |
| 3,843,867 | A | 10/1974 | Helton |
| 3,848,109 | A | 11/1974 | Zvanut |
| 3,849,871 | A | 11/1974 | Kaunitz |
| 3,868,491 | A | 2/1975 | Ito |
| 3,946,349 | A | 3/1976 | Haldeman |
| 4,010,309 | A | 3/1977 | Petersen |
| 4,045,593 | A | 8/1977 | Hill |
| 4,110,514 | A | 8/1978 | Nicholson |
| 4,122,238 | A | 10/1978 | Frantzerb, Sr. |
| 4,131,784 | A | 12/1978 | Kimura |
| 4,160,066 | A | 7/1979 | Szumachowski |
| 4,160,967 | A | 7/1979 | Beech |
| 4,188,419 | A | 2/1980 | Detert |
| 4,222,023 | A | 9/1980 | Beech |
| 4,282,420 | A | 8/1981 | Banks |
| 4,426,565 | A | 1/1984 | Rueter |
| 4,447,703 | A | 5/1984 | Stol |
| 4,449,031 | A | 5/1984 | Kotecki |
| 4,493,971 | A | 1/1985 | Nawa |
| 4,517,441 | A | 5/1985 | Kaljee |
| 4,531,040 | A | 7/1985 | Nawa |
| 4,536,634 | A | 8/1985 | Nawa |
| 4,546,234 | A * | 10/1985 | Ogasawara ............ B23K 9/125 219/130.21 |
| 4,551,610 | A | 11/1985 | Amata |
| 4,580,026 | A | 4/1986 | Stol |
| 4,584,459 | A | 4/1986 | Merrick |
| 4,628,182 | A | 12/1986 | Hori |
| 4,631,385 | A | 12/1986 | Rothermel |
| 4,667,083 | A | 5/1987 | Stol |
| 4,728,761 | A | 3/1988 | Mucha |
| 4,833,296 | A | 5/1989 | Crockett |
| 4,843,212 | A | 6/1989 | Shneerov |
| 4,897,523 | A | 1/1990 | Parks |
| 4,950,348 | A | 8/1990 | Larsen |
| 4,954,691 | A | 9/1990 | Parks |
| 4,973,821 | A | 11/1990 | Martin |
| 5,001,326 | A | 3/1991 | Stava |
| 5,043,557 | A | 8/1991 | Tabata |
| 5,086,207 | A | 2/1992 | Deam |
| 5,101,086 | A | 3/1992 | Dion |
| 5,118,028 | A | 6/1992 | Ogawa |
| 5,140,123 | A | 8/1992 | Mitani |
| 5,148,001 | A | 9/1992 | Stava |
| 5,208,433 | A | 5/1993 | Hellegouarc |
| 5,270,516 | A | 12/1993 | Hamamoto |
| 5,278,390 | A | 1/1994 | Blankenship |
| 5,315,089 | A | 5/1994 | Hughes |
| 5,319,179 | A | 6/1994 | Joecks |
| 5,343,023 | A | 8/1994 | Geissler |
| 5,349,156 | A | 9/1994 | Madigan |
| 5,352,871 | A | 10/1994 | Ross |
| 5,365,036 | A | 11/1994 | Crockett |
| 5,367,138 | A | 11/1994 | Moss |
| 5,369,244 | A | 11/1994 | Kulikowski |
| 5,412,184 | A | 5/1995 | McGaffigan |
| 5,438,083 | A | 8/1995 | Takimoto |
| 5,461,215 | A | 10/1995 | Haldeman |
| 5,466,916 | A | 11/1995 | Iguchi |
| 5,504,309 | A | 4/1996 | Geissler |
| 5,526,561 | A | 6/1996 | McGaffigan |
| 5,686,002 | A | 11/1997 | Flood |
| 5,710,413 | A | 1/1998 | King |
| 5,714,738 | A | 2/1998 | Hauschulz |
| 5,739,506 | A | 4/1998 | Hanton |
| 5,742,029 | A | 4/1998 | Stava |
| 5,756,967 | A | 5/1998 | Quinn |
| 5,773,799 | A | 6/1998 | Maxfield |
| 5,783,799 | A | 7/1998 | Geissler |
| 5,824,992 | A | 10/1998 | Nagarajan |
| 5,844,193 | A | 12/1998 | Nomura |
| 5,857,141 | A | 1/1999 | Keegan |
| 5,963,022 | A | 10/1999 | Buda |
| 5,968,587 | A | 10/1999 | Frankel |
| 6,002,104 | A | 12/1999 | Hsu |
| 6,008,470 | A | 12/1999 | Zhang |
| 6,043,471 | A | 3/2000 | Wiseman |
| 6,051,810 | A | 4/2000 | Stava |
| 6,090,067 | A | 7/2000 | Carter |
| 6,107,602 | A | 8/2000 | Geissler |
| 6,115,273 | A | 9/2000 | Geissler |
| 6,169,263 | B1 | 1/2001 | Derby |
| 6,204,476 | B1 * | 3/2001 | Reynolds ............... B23K 9/091 219/130.51 |
| 6,242,113 | B1 | 6/2001 | Kiser |
| 6,248,976 | B1 | 6/2001 | Blankenship |
| 6,265,688 | B1 | 7/2001 | Lyshkow |
| 6,278,074 | B1 | 8/2001 | Morlock |
| 6,292,715 | B1 | 9/2001 | Rongo |
| 6,331,694 | B1 | 12/2001 | Blankenship |
| 6,339,209 | B1 | 1/2002 | Kotecki |
| 6,359,258 | B1 | 3/2002 | Blankenship |
| 6,479,792 | B1 | 11/2002 | Beiermann |
| 6,486,439 | B1 | 11/2002 | Spear |
| 6,515,259 | B1 | 2/2003 | Hsu |
| 6,583,386 | B1 | 6/2003 | Ivkovich |
| 6,596,970 | B2 | 7/2003 | Blankenship |
| 6,624,388 | B1 | 9/2003 | Blankenship |
| 6,642,482 | B2 | 11/2003 | Rappl |
| 6,670,579 | B2 | 12/2003 | Davidson |
| 6,674,047 | B1 | 1/2004 | Hughes |
| 6,707,001 | B1 | 3/2004 | Ulrich |
| 6,710,297 | B1 | 3/2004 | Artelsmair |
| 6,720,529 | B2 | 4/2004 | Davidson |
| 6,723,954 | B2 | 4/2004 | Nikodym |
| 6,744,012 | B2 | 6/2004 | Ueda |
| 6,747,247 | B2 | 6/2004 | Holverson |
| 6,784,401 | B2 | 8/2004 | North |
| 6,849,828 | B2 | 2/2005 | Aigner |
| 6,906,284 | B2 | 6/2005 | Kim |
| 6,909,067 | B2 | 6/2005 | Davidson |
| 6,933,466 | B2 | 8/2005 | Hutchison |
| 6,940,042 | B2 | 9/2005 | Hara |
| 6,958,263 | B2 | 10/2005 | Bhattacharyya |
| 6,974,931 | B2 | 12/2005 | Holverson |
| 6,974,932 | B2 | 12/2005 | Holverson |
| 6,984,806 | B2 | 1/2006 | Huismann |
| 6,995,338 | B2 | 2/2006 | Hutchison |
| 7,002,103 | B2 | 2/2006 | Holverson |
| 7,087,860 | B2 | 8/2006 | Nikodym |
| 7,091,448 | B2 | 8/2006 | North |
| 7,129,443 | B2 | 10/2006 | Davidson |
| 7,145,101 | B2 | 12/2006 | Tong |
| 7,244,905 | B2 | 7/2007 | Das |
| 7,265,320 | B2 | 9/2007 | Ou |
| 7,304,269 | B2 | 12/2007 | Fulmer |
| 7,307,240 | B2 | 12/2007 | Holverson |
| 7,351,933 | B2 | 4/2008 | Huismann |
| 7,683,290 | B2 | 3/2010 | Daniel |
| 8,203,100 | B2 | 6/2012 | Ueda |
| 8,288,686 | B2 | 10/2012 | Kaufman |
| 8,487,215 | B2 | 7/2013 | Holverson |
| 8,758,901 | B2 | 6/2014 | Nakamura |
| 9,403,231 | B2 | 8/2016 | Hutchison |
| 9,539,662 | B2 | 1/2017 | Hutchison |
| 2001/0008235 | A1 | 7/2001 | Miszczak |
| 2002/0008095 | A1 | 1/2002 | Norrish |
| 2002/0045970 | A1 | 4/2002 | Krause |
| 2002/0107825 | A1 | 8/2002 | Manicke |
| 2002/0117487 | A1 | 8/2002 | Corby |
| 2002/0117488 | A1 | 8/2002 | Arndt |
| 2003/0058149 | A1 | 3/2003 | Jayadeva |
| 2004/0010342 | A1 | 1/2004 | Thelen |
| 2004/0026396 | A1 | 2/2004 | Nikodym |
| 2004/0069759 | A1 | 4/2004 | Davidson |

(56) References Cited

U.S. PATENT DOCUMENTS

| | | |
|---|---|---|
| 2004/0182828 A1 | 9/2004 | Schmidt |
| 2004/0222204 A1 | 11/2004 | Hutchison |
| 2004/0238511 A1 | 12/2004 | Matus |
| 2005/0016974 A1* | 1/2005 | Myers ............... B23K 9/0953 219/130.51 |
| 2005/0061791 A1* | 3/2005 | Matus ............... B23K 9/1006 219/130.21 |
| 2005/0184039 A1 | 8/2005 | Stava |
| 2005/0189337 A1 | 9/2005 | Baune |
| 2005/0269306 A1 | 12/2005 | Fulmer |
| 2006/0151453 A1 | 7/2006 | Gordon |
| 2006/0163229 A1 | 7/2006 | Hutchison |
| 2006/0163231 A1 | 7/2006 | Kobayashi |
| 2006/0165552 A1 | 7/2006 | Kapoor |
| 2006/0219685 A1 | 10/2006 | Karogal |
| 2006/0255026 A1 | 11/2006 | North |
| 2007/0017956 A1 | 1/2007 | Karogal |
| 2007/0051711 A1 | 3/2007 | Kachline |
| 2007/0084840 A1 | 4/2007 | Davidson |
| 2007/0102407 A1 | 5/2007 | Uezono |
| 2007/0170163 A1 | 7/2007 | Narayanan |
| 2007/0193995 A1 | 8/2007 | Kapoor |
| 2007/0235434 A1 | 10/2007 | Davidson |
| 2007/0267393 A1* | 11/2007 | Dodge ............... B23K 9/092 219/130.1 |
| 2007/0267394 A1 | 11/2007 | Beck |
| 2008/0006612 A1* | 1/2008 | Peters ............... B23K 9/04 219/76.14 |
| 2008/0057341 A1 | 3/2008 | Bouillot |
| 2008/0264916 A1 | 10/2008 | Nagano |
| 2008/0264917 A1 | 10/2008 | White |
| 2008/0264923 A1 | 10/2008 | White |
| 2008/0272100 A1 | 11/2008 | Amata |
| 2009/0026188 A1 | 1/2009 | Schorghuber |
| 2009/0045172 A1 | 2/2009 | VanErk |
| 2009/0173726 A1 | 7/2009 | Davidson |
| 2009/0298024 A1 | 12/2009 | Batzler |
| 2010/0059493 A1 | 3/2010 | McAninch |
| 2010/0096373 A1 | 4/2010 | Hillen |
| 2010/0101780 A1 | 4/2010 | Ballew |
| 2010/0133250 A1 | 6/2010 | Sardy |
| 2010/0176104 A1* | 7/2010 | Peters ............... B23K 9/0738 219/130.21 |
| 2010/0224610 A1 | 9/2010 | Wallace |
| 2010/0308026 A1 | 12/2010 | Vogel |
| 2010/0308027 A1 | 12/2010 | Vogel |
| 2010/0314371 A1 | 12/2010 | Davidson |
| 2011/0108527 A1 | 5/2011 | Peters |
| 2011/0114612 A1 | 5/2011 | Holverson |
| 2011/0163080 A1 | 7/2011 | Beck |
| 2011/0204034 A1 | 8/2011 | Schartner |
| 2011/0297658 A1 | 8/2011 | Peters |
| 2011/0248007 A1 | 10/2011 | Takeda |
| 2011/0316516 A1 | 12/2011 | Schiefermuller |
| 2012/0024828 A1 | 2/2012 | Oowaki |
| 2012/0057240 A1 | 3/2012 | Sundell |
| 2012/0061362 A1 | 3/2012 | Davidson |
| 2012/0074112 A1 | 3/2012 | Kotera |
| 2012/0097655 A1 | 4/2012 | Daniel |
| 2012/0248080 A1 | 10/2012 | Hutchison |
| 2012/0291172 A1 | 11/2012 | Wills |
| 2012/0298642 A1 | 11/2012 | Lambert |
| 2013/0112674 A1 | 5/2013 | Mnich |
| 2013/0112676 A1* | 5/2013 | Hutchison ............... B23K 9/095 219/130.51 |
| 2013/0264323 A1 | 10/2013 | Daniel |
| 2013/0270245 A1 | 10/2013 | Holverson |
| 2013/0313240 A1 | 11/2013 | Amata |
| 2014/0021183 A1 | 1/2014 | Peters |
| 2014/0083981 A1 | 3/2014 | Amata |
| 2014/0097168 A1 | 4/2014 | Ferree |
| 2014/0158669 A1 | 6/2014 | Davidson |
| 2014/0183176 A1 | 7/2014 | Hutchison |
| 2014/0251971 A1 | 9/2014 | Hearn |
| 2014/0263237 A1 | 9/2014 | Daniel |
| 2014/0263241 A1 | 9/2014 | Henry |
| 2014/0263243 A1 | 9/2014 | Marschke |
| 2014/0349136 A1 | 11/2014 | Barhorst |
| 2014/0367370 A1 | 12/2014 | Hutchison |
| 2014/0374385 A1* | 12/2014 | Kawano ............... B23H 7/04 219/69.12 |
| 2015/0001197 A1 | 1/2015 | Marschke |
| 2015/0083702 A1 | 3/2015 | Scott |
| 2015/0105898 A1 | 4/2015 | Adams |
| 2016/0074954 A1 | 3/2016 | Marschke |
| 2016/0144444 A1 | 5/2016 | Davidson |
| 2016/0167151 A1 | 6/2016 | Mehn |
| 2016/0288235 A1 | 10/2016 | Davidson |
| 2016/0318112 A1 | 11/2016 | Hutchison |

FOREIGN PATENT DOCUMENTS

| | | |
|---|---|---|
| CN | 1298778 | 6/2001 |
| CN | 1496774 | 5/2004 |
| CN | 1600486 | 3/2005 |
| CN | 1640603 | 7/2005 |
| CN | 1712168 | 12/2005 |
| CN | 1714978 | 1/2006 |
| CN | 1836818 | 9/2006 |
| CN | 1871093 | 11/2006 |
| CN | 101062530 | 10/2007 |
| CN | 201098775 | 8/2008 |
| CN | 101376191 | 3/2009 |
| CN | 101804495 | 8/2010 |
| CN | 101862886 | 10/2010 |
| CN | 102470473 | 5/2012 |
| CN | 102554418 | 7/2012 |
| CN | 102581513 | 7/2012 |
| CN | 102596475 | 7/2012 |
| CN | 102770228 | 11/2012 |
| CN | 202822943 | 3/2013 |
| DE | 2501928 | 7/1976 |
| DE | 19808383 | 9/1999 |
| EP | 0194045 | 9/1986 |
| EP | 0387223 | 9/1990 |
| EP | 0688630 | 12/1995 |
| EP | 1226897 | 7/2002 |
| EP | 1232825 | 8/2002 |
| EP | 1728584 | 12/2006 |
| EP | 1775060 | 4/2007 |
| EP | 2218537 | 8/2010 |
| EP | 2286949 | 2/2011 |
| EP | 2343149 | 7/2011 |
| EP | 2567776 | 3/2013 |
| FR | 1443701 | 6/1966 |
| GB | 739375 | 10/1955 |
| GB | 1143600 | 2/1969 |
| GB | 1183463 | 3/1970 |
| GB | 2204324 | 11/1988 |
| JP | S5719166 | 2/1982 |
| JP | S57109573 | 7/1982 |
| JP | S58196192 | 11/1983 |
| JP | S60108175 | 6/1985 |
| JP | S60108176 | 6/1985 |
| JP | S6167597 | 4/1986 |
| JP | S6471575 | 3/1989 |
| JP | H03285768 | 12/1991 |
| JP | H06277840 | 10/1994 |
| JP | H07204848 | 8/1995 |
| JP | H11156542 | 6/1999 |
| JP | 2001276971 | 10/2001 |
| JP | 2003266194 | 9/2003 |
| JP | 2003311409 | 11/2003 |
| JP | 2005034853 | 2/2005 |
| JP | 2006205189 | 8/2006 |
| JP | 2009072814 | 4/2009 |
| JP | 4950819 | 6/2012 |
| KR | 1020120027764 | 3/2012 |
| RU | 2253556 | 6/2005 |
| SU | 872102 | 10/1981 |
| WO | 9640465 | 12/1996 |
| WO | 9934950 | 7/1999 |
| WO | 0132347 | 5/2001 |

(56) References Cited

FOREIGN PATENT DOCUMENTS

| WO | 0153030 | 7/2001 |
|----|---------|--------|
| WO | 0163974 | 8/2001 |
| WO | 0212581 | 2/2002 |
| WO | 2005030422 | 4/2005 |
| WO | 2008137371 | 11/2008 |
| WO | 2013177480 | 11/2013 |
| WO | 2014058725 | 4/2014 |

OTHER PUBLICATIONS

"Maxstar 200 SD, DX, and LX," Miller Electric Mfg. Co., Oct. 2003.

American Welding Online, "Efforts to Reduce Manganese Fume Emissions During Flux Cored Arc Welding of Standard Carbon Steels," posted Apr. 16, 2014 at 11:53 am, http://awo.aws.org/2014/04/efforts-to-reduce-manganese-fume-emissions-during-flux-cored-arc-welding-of-standard-carbon-steels/.

American Welding Society F1.2:2006, Laboratory Method for Measuring Fume Generation Rate and Total Fume Emission of Welding and Allied Processes, Jan. 28, 2006, pp. 4-6.

American Welding Society F3.2M/F3.2:2001, Ventilation Guide for Weld Fume, Annex B, C, and D, Jan. 1, 2001, pp. 21-26.

Bondy et al., "Graph Theory with Appliations," University of Waterloo, 1976, p. 7-8.

Guide for Estimating Welding Emissions for EPA and Ventilation Permit Reporting, American Welding Society F1.6:2003, Feb. 25, 2003, 6 pgs.

International Search Report from PCT application No. PCT/US2016/061388, dated Feb. 8, 2017, 12 pgs.

Safety in Welding, Cutting, and Allied Processes, An American National Standard, American Welding Society, Mar. 9, 2012, pp. 1-70.

Canadian Office Action Appln No. 3,005,216 dated Mar. 18, 2019.

\* cited by examiner

WELDING SYSTEM AND METHOD FOR SHIELDED WELDING WIRES

BACKGROUND

The invention relates generally to welders, and more particularly to a welder configured to perform a welding operation in which a cyclic waveform is applied to welding wire to avoid or minimize micro-arcing between the welding wire and other components, such as the welding torch contact tip.

A wide range of welding systems and welding control regimes have been implemented for various purposes. In continuous welding operations, gas metal arc welding (GMAW), and more specifically, metal inert gas (MIG) techniques allow for formation of a continuing weld bead by feeding welding wire electrode shielded gas (typically an inert gas or gas containing inert agents) from a welding torch. Electrical power is applied to the welding wire and a circuit is completed through the workpiece to sustain an arc that melts the wire and the workpiece to form the desired weld.

Advanced forms of MIG welding are based upon generation of cyclic pulses that allow for the desired melting of the welding wire and the workpiece, while also providing the desired deposition of wire material in the weld. Increasingly sophisticated pulsed welding regimes are being developed that are adapted to specific materials, conditions, workpiece materials and configurations, shielding technologies, and so forth. One type of welding wire electrode that has gained increasing acceptance has a sheath or shell that surrounds a core material. Both may be made of carefully selected materials to provide for flow of the material, combined metallurgy, and other useful characteristics both during the welding process and in the resulting weld.

There continues to be a need, however, for welding processes that are adapted to specific welding wire electrodes so that the welding process may be optimized and high quality welds may be consistently produced.

BRIEF DESCRIPTION

The present disclosure provides welding systems and methods designed to respond to such needs. In accordance with an exemplary implementation, a welding method comprises generating a control waveform for welding power output, the waveform comprising a plurality of successive peak phases of voltage and current, followed by a transition phase, followed by a background phase of voltage and current, and regulating each background phase such that a ratio of background current to peak current is at least approximately 25%, and a ratio of background voltage to peak voltage is at least approximately 50%.

In accordance with other aspects, a welding method is provided that comprises generating a control waveform for a cyclically pulsed welding regime, the waveform comprising a plurality of successive peak phases of voltage and current, followed by a transition phase, followed by a background phase of voltage and current, providing welding power to a welding wire electrode at desired voltage and current levels based upon the waveform, the welding wire electrode comprising a metal-cored or flux-cored wire, and regulating each background phase and each peak phase to reduce micro-arcing between the welding wire electrode and other components, such as the welding torch contact tip.

The disclosure also relates to welding systems, and, for example, to a welding system that comprises a power supply configured to convert electrical power from a source to a controlled pulsed waveform for performing a welding operation, and control circuitry coupled to the power supply and configured to control generation of the controlled pulsed waveform, the waveform comprising a plurality of successive peak phases of voltage and current, followed by a transition phase, followed by a background phase of voltage and current, and wherein the control circuitry is configured to regulate each background phase such that a ratio of background current to peak current is at least approximately 25%, and a ratio of background voltage to peak voltage is at least approximately 50%.

DRAWINGS

DETAILED DESCRIPTION

Figure 1:
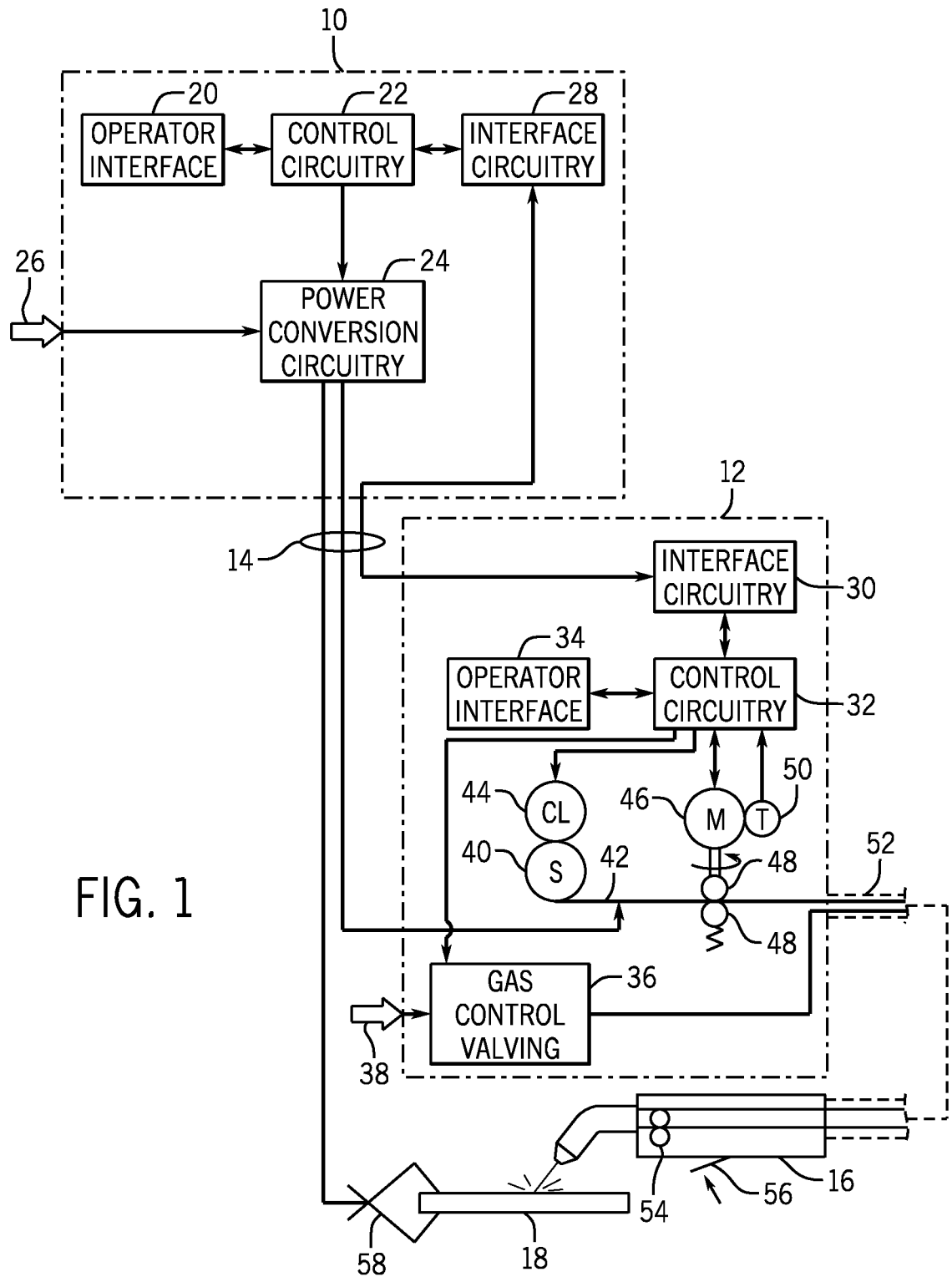
FIG. 1 is a diagrammatical representation of an exemplary MIG welding system illustrating a power supply coupled to a wire feeder for performing pulsed welding operations in accordance with aspects of the present techniques.

Turning now to the drawings, and referring first to FIG. 1, an exemplary welding system is illustrated as including a power supply 10 and a wire feeder 12 coupled to one another via conductors or conduits 14. In the illustrated embodiment the power supply 10 is separate from the wire feeder 12, such that the wire feeder may be positioned at some distance from the power supply near a welding location. However, it should be understood that the wire feeder, in some implementations, may be integral with the power supply. In such cases, the conduits 14 would be internal to the system. In embodiments in which the wire feeder is separate from the power supply, terminals are typically provided on the power supply and on the wire feeder to allow the conductors or conduits to be coupled to the systems so as to allow for power and gas to be provided to the wire feeder from the power supply, and to allow data to be exchanged between the two devices.

The system is designed to provide wire, power and shielding gas to a welding torch 16. As will be appreciated by those skilled in the art, the welding torch may be of many different types, and typically allows for the feed of a welding wire and gas to a location adjacent to a workpiece 18 where a weld is to be formed to join two or more pieces of metal. A second conductor is typically run to the welding workpiece so as to complete an electrical circuit between the power supply and the workpiece. As will be appreciated by those skilled in the art, the torch will typically include a contact tip (not separately shown) that will permit completing an electrical circuit between the power source (and cabling) and the advancing welding wire (electrode). It has been found that micro-arcing can occur between the wire and the contact tip that can be detrimental to the torch and that may degrade the resulting welding operation. The techniques described below address such issues and reduce or avoid such micro-arcing.

The system is designed to allow for data settings to be selected by the operator, particularly via an operator interface 20 provided on the power supply. The operator interface will typically be incorporated into a front faceplate of the power supply, and may allow for selection of settings such as the weld process, the type of wire to be used, voltage and current settings, and so forth. In particular, the system is designed to allow for MIG welding with various steels, aluminums, or other welding wire that is channeled through the torch. These weld settings are communicated to control circuitry 22 within the power supply. The system may be particularly adapted to implement welding regimes designed for certain electrode types.

The control circuitry, described in greater detail below, operates to control generation of welding power output that is applied to the welding wire for carrying out the desired welding operation. In certain presently contemplated embodiments, for example, the control circuitry may be adapted to regulate a pulsed MIG welding regime that promotes the melting and joining of the welding wire and workpieces, while avoiding micro-arcing between the welding wire and the welding torch contact tip. The pulsed welding regime implemented is adapted for welding wires that may be particularly subject to such micro-arcing, such as flux-cored or metal-cored welding wires. Such wires are described, for example, in U.S. Publication No. 2013/0313240, entitled "Systems and Methods for Low-Manganese Welding Wire", filed by Amata et al. on Mar. 15, 2013; U.S. Publication No. 2014/0083981, entitled "Systems and Methods for Low-Manganese Welding Wire", filed by Amata et al. on Nov. 21, 2013; U.S. Pat. No. 9,895,774, entitled "Systems and Methods for Low-Manganese Welding Alloys", filed by Barhorst et al. on Apr. 30, 2014; and U.S. Pat. No. 9,844,838, entitled "Systems and Methods for Low-Manganese Welding Alloys", filed by Barhorst et al. on Aug. 12, 2014, which are hereby incorporated into the present disclosure by reference. Moreover, certain wires of this type are available from Miller Electric Mfg. Co. under the commercial designation "Hobart Element™". Such wires may have a low manganese content, which is believed to increase the likelihood of micro-arcing and also seems to affect the wet-out and flow of the molten material. The welding techniques address these issues, particularly when such wires are used. It should be noted, however, that the present techniques may be used with a wide variety of welding wires, including solid wires. It will be particularly useful for wires, solid or shielded, that do not respond well to pulsed welding regimes and/or for which the material transfer could be improved, wet-out and flowability can be enhanced, and so forth.

As described more fully below, the present techniques allow for control successive voltage and/or current pulses to allow for the control of the welding arc, and to transition smoothly between phases (e.g. peak and background phases) of the pulsed welding regime, while avoiding micro-arcing. In particular, in certain presently contemplated embodiments, voltage peaks in waveforms are regulated to be longer than conventional peak phases, while the background phase generally has a higher current level as compared to the peak level than conventional regimes. Also, transition from the peak is substantially smoothed to avoid abrupt changes in the current and voltage. Certain of these may be adapted for particular wire sizes, and when implemented, specific control parameters defining the peak, background and transitions may be directed to both the type and size of wire (as well as other welding parameters, such as wire feed speed).

The control circuitry is coupled to power conversion circuitry 24. This power conversion circuitry is adapted to create the output power, such as pulsed waveforms that will ultimately be applied to the welding wire at the torch. Various power conversion circuits may be employed, including choppers, boost circuitry, buck circuitry, inverters, converters, and so forth. The configuration of such circuitry may be of types generally known in the art in and of itself. The power conversion circuitry 24 is coupled to a source of electrical power as indicated by arrow 26. The power applied to the power conversion circuitry 24 may originate in the power grid, although other sources of power may also be used, such as power generated by an engine-driven generator, batteries, fuel cells or other alternative sources. Finally, the power supply illustrated in FIG. 1 includes interface circuitry 28 designed to allow the control circuitry 22 to exchange signals with the wire feeder 12.

The wire feeder 12 includes complimentary interface circuitry 30 that is coupled to the interface circuitry 28. In some embodiments, multi-pin interfaces may be provided on both components and a multi-conductor cable run between the interface circuitry to allow for such information as wire feed speeds, processes, selected currents, voltages or power levels, and so forth to be set on either the power supply 10, the wire feeder 12, or both.

The wire feeder 12 also includes control circuitry 32 coupled to the interface circuitry 30. As described more fully below, the control circuitry 32 allows for wire feed speeds to be controlled in accordance with operator selections, and permits these settings to be fed back to the power supply via the interface circuitry. The control circuitry 32 is coupled to an operator interface 34 on the wire feeder that allows selection of one or more welding parameters, particularly wire feed speed. The operator interface may also allow for selection of such weld parameters as the process, the type of wire utilized, current, voltage or power settings, and so forth. The control circuitry 32 is also coupled to gas control valving 36 which regulates the flow of shielding gas to the torch. In general, such gas is provided at the time of welding, and may be turned on immediately preceding the weld and for a short time following the weld. The gas applied to the gas control valving 36 is typically provided in the form of pressurized bottles, as represented by reference numeral 38. It should be noted that with certain wires, shielding gases may not be required, or mixes of shielding gases may be varied based on the types and requirements of the wire.

The wire feeder 12 includes components for feeding wire to the welding torch and thereby to the welding application, under the control of control circuitry 32. For example, one or more spools of welding wire 40 are housed in the wire feeder. Welding wire 42 is unspooled from the spools and is progressively fed to the torch. The spool may be associated with a clutch 44 that disengages the spool when wire is to be fed to the torch. The clutch may also be regulated to maintain a minimum friction level to avoid free spinning of the spool. A feed motor 46 is provided that engages with feed rollers 48 to push wire from the wire feeder towards the torch. In practice, one of the rollers 48 is mechanically coupled to the motor and is rotated by the motor to drive the wire from the wire feeder, while the mating roller is biased towards the wire to maintain good contact between the two rollers and the wire. Some systems may include multiple rollers of this type. Finally, a tachometer 50 may be provided for detecting the speed of the motor 46, the rollers 48, or any other associated component so as to provide an indication of the actual wire feed speed. Signals from the tachometer are fed back to the control circuitry 32, such as for calibration as described below.

It should be noted that other system arrangements and input schemes may also be implemented. For example, the welding wire may be fed from a bulk storage container (e.g., a drum) or from one or more spools outside of the wire feeder. Similarly, the wire may be fed from a "spool gun" in which the spool is mounted on or near the welding torch. As noted herein, the wire feed speed settings may be input via the operator input 34 on the wire feeder or on the operator interface 20 of the power supply, or both. In systems having wire feed speed adjustments on the welding torch, this may be the input used for the setting.

Power from the power supply is applied to the wire electrode, typically by means of a welding cable 52 in a conventional manner. Similarly, shielding gas, if used, is fed through the wire feeder and the welding cable 52. During welding operations, the wire is advanced through the welding cable jacket towards the torch 16. Within the torch, an additional pull motor 54 may be provided with an associated drive roller, particularly for aluminum alloy welding wires. The motor 54 is regulated to provide the desired wire feed speed as described more fully below. A trigger switch 56 on the torch provides a signal that is fed back to the wire feeder and therefrom back to the power supply to enable the welding process to be started and stopped by the operator. That is, upon depression of the trigger switch, gas flow is begun, wire is advanced, power is applied to the welding cable 52 and through the torch to the advancing welding wire. These processes are also described in greater detail below. Finally, a workpiece cable and clamp 58 allow for closing an electrical circuit from the power supply through the welding torch, the electrode (wire), and the workpiece for maintaining the welding arc during operation.

It should be noted throughout the present discussion that while the wire feed speed may be "set" by the operator, the actual speed commanded by the control circuitry will typically vary during welding for many reasons. For example, automated algorithms for "run in" (initial feed of wire for arc initiation) may use speeds derived from the set speed. Similarly, various ramped increases and decreases in wire feed speed may be commanded during welding. Other welding processes may call for "cratering" phases in which wire feed speed is altered to fill depressions following a weld. Still further, in pulsed welding regimes, the wire feed speed may be altered periodically or cyclically.

Figure 2:
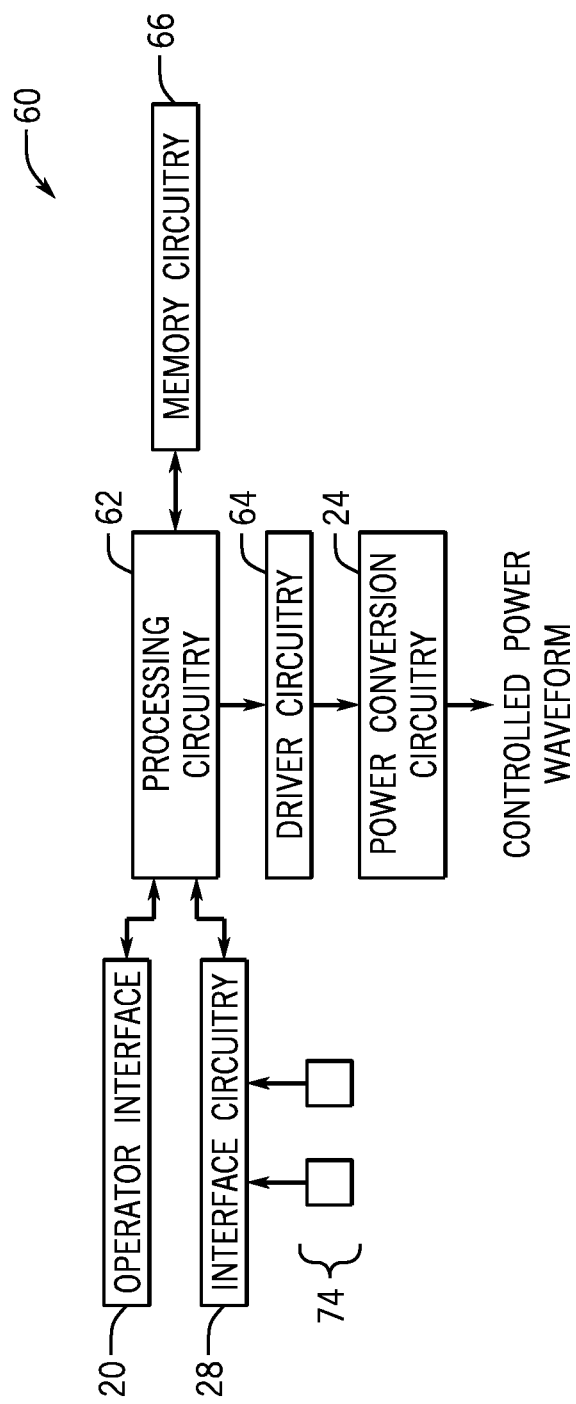
FIG. 2 is a diagrammatical representation of exemplary control circuitry components for a welding power supply of the type shown in FIG. 1.

FIG. 2 illustrates an exemplary embodiment for the control circuitry 22 designed to function in a system of the type illustrated in FIG. 1. The overall circuitry, designated here by reference numeral 60, includes the operator interface 20 discussed above and interface circuitry 28 for communication of parameters to and from downstream components such as a wirefeeder, a welding torch, and various sensors and/or actuators. The circuitry includes processing circuitry 62 which itself may comprise one or more application-specific or general purpose processors, designed to carry out welding regimes, make computations for waveforms implemented in welding regimes, and so forth. The processing circuitry is associated with driver circuitry 64 which converts control signals from the processing to drive signals that are applied to power electronic switches of the power conversion circuitry 24. In general, the driver circuitry reacts to such control signals from the processing circuitry to allow the power conversion circuitry to generate controlled waveforms for pulsed welding regimes of the type described in the present disclosure. The processing circuitry 62 will also be associated with memory circuitry 66 which may consist of one or more types of permanent and temporary data storage, such as for providing the welding regimes implemented, storing welding parameters, storing weld settings, storing error logs, and so forth.

More complete descriptions of certain state machines for welding are provided, for example, in U.S. Pat. No. 6,747,247, entitled "Welding-Type Power Supply With A State-Based Controller", issued to Holverson et al. on Sep. 19, 2001; U.S. Pat. No. 7,002,103, entitled "Welding-Type Power Supply With A State-Based Controller", issued to Holverson et al. on May 7, 2004; U.S. Pat. No. 7,307,240, entitled "Welding-Type Power Supply With A State-Based Controller", issued to Holverson et al. on Feb. 3, 2006; and U.S. Pat. No. 6,670,579, entitled "Welding-Type System With Network And Multiple Level Messaging Between Components", issued to Davidson et al. on Sep. 19, 2001, all of which are incorporated into the present disclosure by reference.

Figure 3:
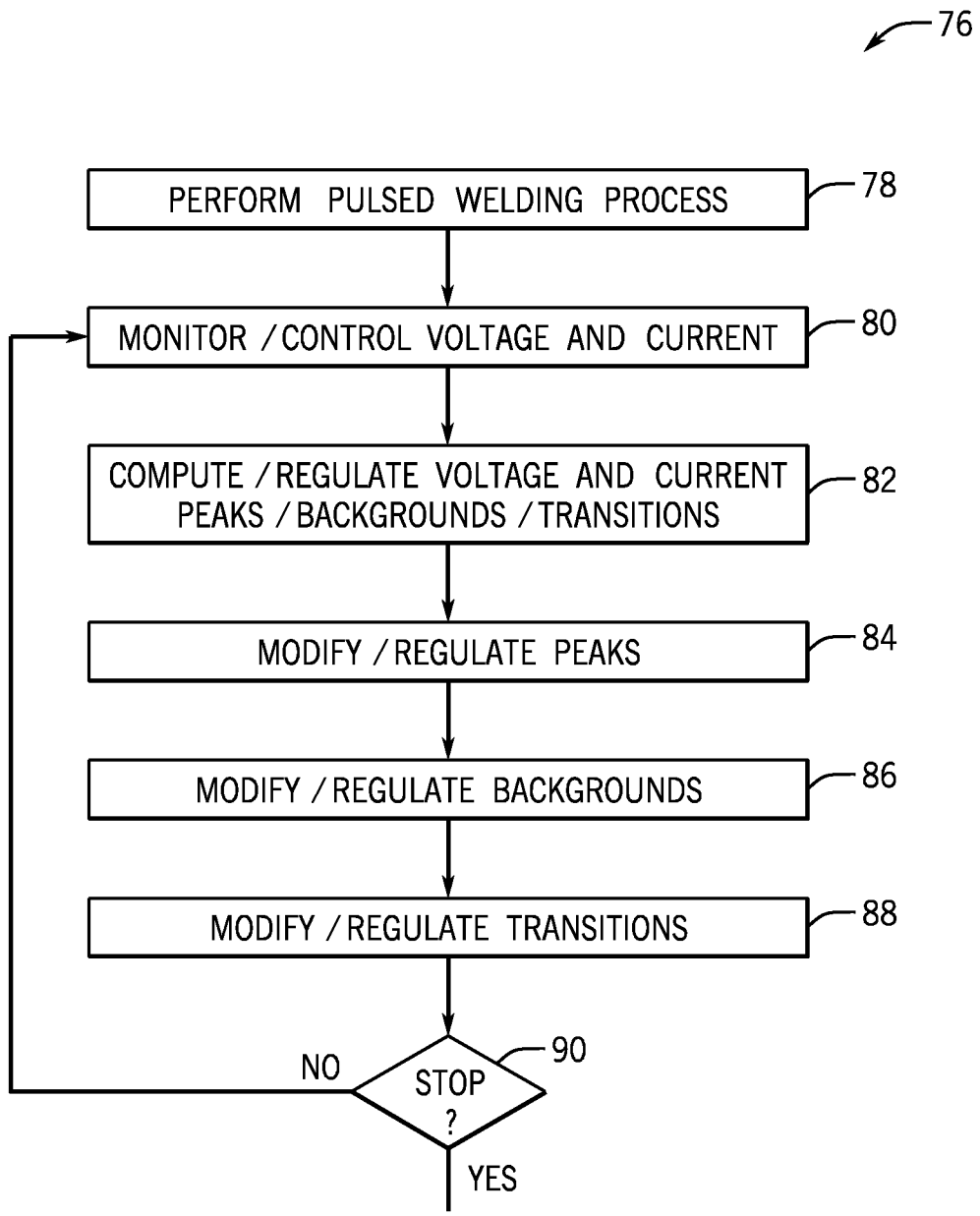
FIG. 3 is a flow chart illustrating certain control logic in implementing a welding regime in accordance with the present disclosure.

FIG. 3 generally illustrates logic for a welding regime in which waveforms are controlled to control short circuit characteristics. The logic, indicated generally by reference numeral 76 may be thought of as beginning with performing a pulsed welding process, as indicated by block 78. Such a process may be implemented by closed loop control of voltage applied to a welding electrode (with a circuit completed through the workpiece and advancing weld puddle), by closed loop control of current applied to the electrode, or by control of both voltage and current. In some embodiments, for example, control loops that regulate voltage in a closed loop manner may be alternated with phases of control in which current is controlled in a closed loop manner. In a presently contemplated embodiment, peak, background, and transitions in the pulsed waveform are controlled to allow for establishing and maintaining the welding arc, while avoiding micro-arcing.

At step 80, then, the parameters of the welding process, particularly the voltage and current applied to the welding wire electrode are monitored and controlled. Such monitoring will typically be done by detecting the voltage and current applied to the welding electrode, the welding torch, the weld cable, or some other point in the power stream. The voltage and current may be sampled at a much higher rate than the frequency of the pulsed welding regime. For example, each pulse cycle may be on the order of several milliseconds (e.g., 5 ms), whereas the sampling may be performed on the order of microseconds (e.g., every 50 μs). In most systems, the voltage and current sampling will occur throughout the welding process, and analysis of the voltage and/or current during welding may be done from the data collected.

At step 82 parameters of voltage and/or current peaks are computed and regulated as discussed below. In current embodiments, the parameters of voltage peaks are computed, with the system controlling welding power in a voltage-closed loop manner during the peak phase of the pulsed waveform. That is, the voltage and/or current of the peak is controlled, including the magnitude of the peak, the duration of the peak, the rate of rise to the peak, and the rate of decline from the peak. Some embodiments may control fewer than these parameters. As discussed below, the peaks are regulated to provide an extended duration peak, followed by a gradual decline in the voltage and current, to a background level where a voltage is maintained at a level of at least approximately 50% of the peak voltage. In certain presently contemplated embodiments, the peak and background phases of the pulsed welding regime are voltage closed-loop, while transitions or ramps between the peak and background phases are current closed-loop. However, other adaptations are also contemplated, such as where the entire process is current closed-loop. As indicated by reference numerals 84, 86 and 88, one or more changes may be made to the peak, background, and transition phases of the pulsed waveform used for creating and sustaining the welding arc. In general, these will be defined by a decision engine implemented from code stored in the system memory and executed by the processing circuitry. They may be set, for example, based on such factors as the process selected, the welding wire used, the size of the welding wire, and so forth. During welding, one or more of these parameters may be adjusted based on additional factors, such as wire feed speed, detected voltages and currents, welding torch position, and so forth. At step 90, the logic may loop back to continue the process control until the welder stops welding (e.g., as signaled by releasing the trigger of the welding torch).

It should be noted that while certain reference has been made to an operator and the manual control of welding, the present techniques may also be applied to automated or semi-automated welding, including by the use of welding robots. In such cases, not only is the welding regime controlled by the control circuitry, but positioning, movement and other controls of the welding torch (and/or the workpiece) may also be controlled.

Figure 4:
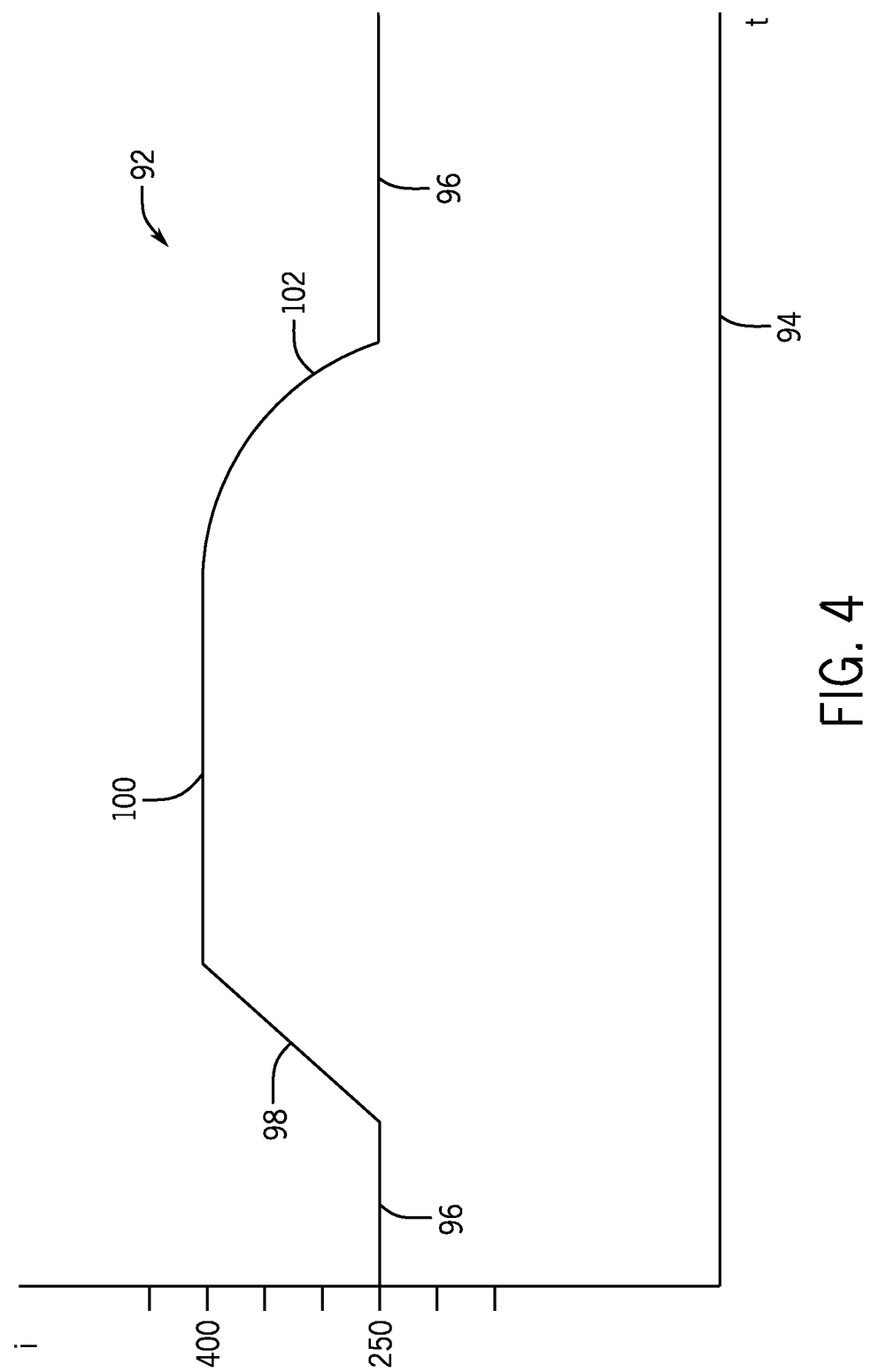
FIG. 4 is a graphical representation of voltages and currents in an exemplary pulse of a welding regime in accordance with the present disclosure.

FIG. 4 illustrates an exemplary waveform 92 for the improved process, displayed over time 94. Here again, the process may include alternating periods or phases of voltage-closed loop control and current-closed loop (e.g., ramp) control, in this case, the peaks being voltage-closed loop controlled, followed by switching to current-closed loop control. In this process, molten metal from the electrode is transferred to the advancing weld puddle in a pulsed process in which micro-arcing is minimized by appropriate regulation of the peaks and backgrounds and the transitions between them.

As shown in FIG. 4, current (and voltage) pulses are formed in the welding process that generally correspond in time, with the current pulse only being shown in FIG. 4. Here again, in some embodiments the current may be closed-loop controlled during transition (ramp) phases of the waveform, while voltage closed-loop control may be used during peak and background phases. The waveform illustrates that the current is held at a relatively stable level during the background phase 96 (e.g., by regulation of voltage, or current, or both), followed by a ramp up of current during the background-to-peak phase 98. An extended peak phase is then implemented as indicated by reference numeral 100. Following the peak phase, a smooth transition phase 102 is implemented to return to the background levels.

To avoid or reduce the risk of micro-arcing, the background currents and voltages are maintained at much higher levels, as compared to the peak levels, than in conventional pulsed welding techniques. For example, for a cored welding wire having a 0.052 inch diameter, the following may be typical programmed levels, based on wire feed speed (WFS) in inches per minute (the currents "i" are in Amps, and the voltages "v" are in volts):

| WFS (ipm) | $i_{peak}$ | $i_{bkgd}$ | $v_{peak}$ | $v_{bkgd}$ |
|---|---|---|---|---|
| 75 | 380 | 40 | 24 | 15 |
| 100 | 400 | 45 | 25 | 15 |
| 150 | 425 | 80 | 25 | 17.5 |
| 200 | 400 | 120 | 26 | 19 |
| 300 | 380 | 220 | 28.5 | 24 |
| 400 | 400 | 250 | 31 | 25 |
| 500 | 420 | 280 | 33.5 | 27 |
| 600 | 450 | 310 | 35.5 | 29 |
| 700 | 470 | 330 | 36.5 | 31 |
| 800 | 480 | 350 | 37.5 | 32 |

Moreover, in presently contemplated embodiments, the ramp from the background phase to the peak phase is set to approximately 350 A/ms for all wire feed speeds, as is the ramp from the peak phase to the background phase. In addition, the duration of the peak phase is extended to approximately 25% of the total duration of each cyclic pulse of the regime, with extended transition phases as shown in FIG. 4. It may be observed that for most of the settings, the background-to-peak current ratios are above 25%, and in most cases above approximately 50%, and up to or in excess of approximately 70%. Similarly, the background-to-peak voltage ratios are above at least 50%, and in most cases above approximately 60%, and up to or in excess of approximately 80%.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding method comprising:
   generating a pulsed arc welding power output waveform, the pulsed arc welding power output waveform comprising a plurality of successive pulse cycles, each of the pulse cycles comprising a peak phase having a peak voltage and a peak current, followed by a transition phase, followed by a background phase having a background voltage and a background current; and
   regulating the background phase of each pulse cycle such that a ratio of the background current to the peak current is at least 50%, and a ratio of the background voltage to the peak voltage is at least 50%.

2. The method of claim 1, wherein control of the peak phase of the waveform is performed based on closed-loop voltage control.

3. The method of claim 1, wherein control of the background phase of the waveform is performed based on closed-loop voltage control.

4. The method of claim 1, the ratio of the background current to the peak current is at least 70%.

5. The method of claim 1, wherein the ratio of the background voltage to the peak voltage is at least 60%.

6. The method of claim 1, wherein the ratio of the background voltage to the peak voltage is at least 80%.

7. The method of claim 1, wherein in the transition phase a current ramp rate of 350 A/ms is implemented.

8. The method of claim 1, wherein a duration of the peak phase is at least 25% of a total duration of one pulse cycle of the waveform.

9. The method as defined in claim 1, further comprising outputting the pulsed arc welding power output waveform via at least one of a flux-cored electrode wire or a metal-cored electrode wire.

10. The method as defined in claim 1, wherein the pulsed arc welding output waveform comprises a direct current (DC) pulsed arc welding output waveform.

11. A welding method, comprising:
generating a direct current (DC) pulsed arc welding power output waveform, the welding power output waveform comprising a plurality of successive pulse cycles, each of the pulse cycles comprising a peak phase having a peak voltage and a peak current, followed by a transition phase, followed by a background phase having a background voltage and a background current; and
regulating the background phase of each pulse cycle such that a ratio of the background current to the peak current is at least 50%, and a ratio of the background voltage to the peak voltage is at least 50%, wherein control of the transition phase of the waveform is performed based on closed-loop current control, control of the peak phase of the waveform is performed based on closed-loop voltage control, and control of the background phase of the waveform is performed based on closed-loop voltage control.

12. A welding system, comprising:
a power supply configured to convert electrical power to a pulsed arc welding power output waveform for performing a welding operation; and
control circuitry configured to control the power supply to:
generate the pulsed arc welding power output waveform, the pulsed arc welding power output waveform comprising a plurality of successive pulse cycles, each of the pulse cycles comprising a peak phase having a peak voltage and a peak current, followed by a transition phase, followed by a background phase having a background voltage and a background current; and
regulate the background phase of each pulse cycle such that a ratio of the background current to the peak current is at least 50%, and a ratio of the background voltage to the peak voltage is at least 50%.

13. The welding system of claim 12, wherein the control circuitry is configured to control the power supply to output the peak phase of the waveform based on closed-loop voltage control.

14. The welding system of claim 12, wherein the control circuitry is configured to control the power supply to output the background phase of the waveform based on closed-loop voltage control.

15. The welding system of claim 12, wherein the control circuitry is configured to control the power supply to output the transition phase of the waveform based on closed-loop current control.

16. The welding system of claim 12, the ratio of the background current to the peak current is at least 70%.

17. The welding system of claim 12, wherein the ratio of the background voltage to the peak voltage is at least 60%.

18. The welding system of claim 12, wherein the ratio of the background voltage to the peak voltage is at least 80%.

* * * * *